United States Patent
Chen et al.

(10) Patent No.: US 10,060,009 B2
(45) Date of Patent: Aug. 28, 2018

(54) METHOD FOR PREPARING RUTILE FROM ACID-SOLUBLE TITANIUM SLAG

(71) Applicant: YUNNAN MINZU UNIVERSITY, Kunming, Yunnan (CN)

(72) Inventors: Guo Chen, Yunnan (CN); Jin Chen, Yunnan (CN); Jinhui Peng, Yunnan (CN); Libo Zhang, Yunnan (CN); Shenghui Guo, Yunnan (CN); Junwen Zhou, Yunnan (CN)

(73) Assignee: YUNNAN MINZU UNIVERSITY, Kunming, Yunnan (CN)

( * ) Notice: Subject to any disclaimer, the term of this patent is extended or adjusted under 35 U.S.C. 154(b) by 0 days.

(21) Appl. No.: 15/320,697

(22) PCT Filed: Sep. 17, 2015

(86) PCT No.: PCT/CN2015/089846
§ 371 (c)(1),
(2) Date: Dec. 20, 2016

(87) PCT Pub. No.: WO2016/183984
PCT Pub. Date: Nov. 24, 2016

(65) Prior Publication Data
US 2018/0030575 A1    Feb. 1, 2018

(30) Foreign Application Priority Data
May 15, 2015  (CN) .......................... 2015 1 0250470

(51) Int. Cl.
*C22B 34/00* (2006.01)
*C22B 34/12* (2006.01)
*B09B 3/00* (2006.01)
*C01G 23/08* (2006.01)

(52) U.S. Cl.
CPC .......... *C22B 34/124* (2013.01); *B09B 3/0083* (2013.01); *C01G 23/08* (2013.01); *C22B 34/125* (2013.01); *C22B 34/1222* (2013.01); *C22B 34/1227* (2013.01); *C22B 34/1245* (2013.01)

(58) Field of Classification Search
CPC ....... C01G 23/04–23/053; C01G 23/08; B09B 3/0083; C22B 34/1245; C22B 34/125; C22B 34/1222; C22B 34/1227
USPC ............................... 423/81, 82, 84
See application file for complete search history.

(56) References Cited

FOREIGN PATENT DOCUMENTS

| CN | 1338431 A | 3/2002 |
| CN | 1540010 A | 10/2004 |
| CN | 1710122 A | 12/2005 |
| CN | 101323465 A | 12/2008 |
| CN | 100455683 C | 1/2009 |
| CN | 101812595 A | 8/2010 |
| CN | 102139918 A | 8/2011 |
| EP | 2796414 | * 10/2014 |
| KR | 1020050122197 A | 12/2005 |
| KR | 1020060073516 A | 6/2006 |
| WO | 2003089674 A2 | 10/2003 |
| WO | 2016/183984 | * 11/2016 |

OTHER PUBLICATIONS

Yonggang Li et al., "Study on the Modification Experimentation of Acidsoluble Titanium Slag", China Nonferrous Metallurgy, vol. 3, Aug. 2007, p. 13-15, 23.
Kun Yang et al., "Pilot Study on Mocrowave Roasting of High Titanium Slag", Mining and Metallurgical Engineering, vol. 34, No. 2, Apr. 2014, p. 77-83.

* cited by examiner

*Primary Examiner* — Steven J Bos
(74) *Attorney, Agent, or Firm* — Novick, Kim & Lee, PLLC; Sang Ho Lee (57) ABSTRACT

Provided is a method for preparing rutile from acid-soluble titanium slag, including: grinding acid-soluble titanium slag; adding a sodium carbonate modifier, and performing microwave irradiation treatment in a microwave device; adding an ammonium bifluoride additive; and performing acid purification and calcination to obtain rutile. By means of a microwave heating mode, the equipment investment needed by the method is low, and the energy consumption is low. The purity of artificial rutile is more than 91%, byproducts are fewer, and the environmental pollution is low.

13 Claims, 1 Drawing Sheet

METHOD FOR PREPARING RUTILE FROM ACID-SOLUBLE TITANIUM SLAG

BACKGROUND

1. Field

The present disclosure relates to a field of preparing inorganic crystals, more particularly, relates to a method for preparing artificial rutile.

2. Description of the Related Art

Generally, methods for producing titanium dioxide include a sulfuric acid method and a chlorination method. Since the chlorination method has advantages such as environmental friendliness and high quality of products compared with the sulfuric acid method, the chlorination method has been greatly developed worldwide. However, raw materials to be charged into a furnace in the chlorination process are required to include 90% or more of $TiO_2$ and 1.5% or less of CaO+MgO. Traditional titanium-rich products prepared by smelting ilmenite in an electric furnace generally include 60-75% of $TiO_2$, which cannot meet requirements of raw materials to be charged into a furnace for preparing titanium dioxide or titanium sponge using the chlorination method.

Worldwide research showed that a titanium slag acid leaching process can be enhanced by adding a modifier to an acid-soluble titanium slag, and thus the grade of the final titanium slag product is effectively improved. Worldwide researchers suggested that main impurity elements in titanium slag are distributed in a form of solid solution in anosovite, or exist in a form of silicate. Moreover, the anosovite and silicate are disturbed in an inlaid form, and thus the grade of the titanium slag product cannot be effectively improved by a conventional acid leaching process or a pressurized acid leaching process.

A method of improving the $TiO_2$ grade of a titanium slag is disclosed in CN200310110821. Artificial rutile including 89.8 wt % of $TiO_2$ is obtained by a fluidized sintering, a reduction by coal gas and an acid leaching process under a high pressure by using titanium slag produced in Panxi Area, China as a starting material. However, requirements of the fluidized sintering and the high pressure devices in the process are harsh, and the grade of the obtained artificial rutile is low. A method of preparing a titanium-rich product using titanium slag obtained by an electric furnace is disclosed in CN100455683C. Titanium-rich products ($TiO_2$>90 wt %) are obtained by an acid-alkali leaching method by using titanium slag produced in Yunnan, China as a starting material. However, a high pressure device is used in the process, and the process has disadvantages such as high investment cost, high difficulty of technical operation and low quality of the obtained titanium-rich products.

In order to address at least one of the technical problems existing in the Related Art, the inventors finally finished the present invention by summarizing the existing technologies and through a large number of experimental research and analysis.

SUMMARY

Technical Problems

An object of the present disclosure is to provide a method for preparing artificial rutile.

Technical Solutions

The present disclosure is achieved by technical solutions described below.

The present disclosure relates to a method for preparing artificial rutile from an acid-soluble titanium slag.

The method includes steps of:

(i) grinding including:

grinding the acid-soluble titanium slag using a grinding device so that 80 wt % or more of the slag has a particle size of −100 mesh, thereby obtaining an acid-soluble titanium slag powder; then (ii) modifying including:

adding sodium carbonate as a modifier to the acid-soluble titanium slag powder obtained in step (i) in an amount of 20-40 wt % based on a weight of the acid-soluble titanium slag powder, mixing uniformly, and then radiating the mixture using microwave at a temperature of 750-850° C. in a microwave device, thereby obtaining a modified acid-soluble titanium slag; then (iii) adding an additive including:

grinding the modified acid-soluble titanium slag obtained in step (ii) so that 80 wt % or more of the slag has a particle size of −160 mesh, and adding ammonium bifluoride as an additive thereto, thereby obtaining an additive-containing acid-soluble titanium slag; and (iv) removing impurities in an acid environment and calcining including:

uniformly mixing the additive-containing acid-soluble titanium slag obtained in step (iii) with a sulfuric acid or hydrochloric acid aqueous solution having a concentration of 15-30 wt % at a solid-liquid ratio of 1:4-6, removing impurities from the additive-containing acid-soluble titanium slag for 90-120 min at a boiling temperature, performing filtration, washing and drying, and performing calcination at a temperature of 900-1000° C. to obtain the rutile.

According to a preferred embodiment of the present disclosure, the acid-soluble titanium slag used in step (i) includes 72.0 wt % or more of $TiO_2$, 2.2 wt % or less of $Al_2O_3$, 9.6 wt % or less of $SiO_2$, 1.5 wt % or less of MgO and 0.5 wt % or less of CaO.

According to another preferred embodiment of the present disclosure, step (ii) includes using sodium hydroxide or a phosphate instead of sodium carbonate as the modifier.

According to another preferred embodiment of the present disclosure, the phosphate includes disodium hydrogen phosphate, sodium dihydrogen phosphate, dipotassium hydrogen phosphate, potassium dihydrogen phosphate or ammonium phosphate.

According to another preferred embodiment of the present disclosure, step (ii) includes adding the modifier in an amount of 25-35 wt % based on the weight of the acid-soluble titanium slag powder.

According to another preferred embodiment of the present disclosure, the microwave device used in step (ii) has a frequency of 2350-2250 MHz.

According to another preferred embodiment of the present disclosure, the microwave device used in step (ii) has a frequency of 912-918 MHz.

According to another preferred embodiment of the present disclosure, the radiating in step (ii) is performed for 1.5-2.5 hours.

According to another preferred embodiment of the present disclosure, step (iii) includes adding the ammonium bifluoride as the additive in an amount of 20-40 wt % based on a total weight of the modified acid-soluble titanium slag.

According to another preferred embodiment of the present disclosure, the calcination in step (iii) includes calcining under a frequency of 912-9180 MHz for 28-32 min in a microwave reactor. According to another preferred embodiment of the present disclosure, the calcination in step (iii) includes calcining under a frequency of 912-918 MHz for 1-3 hours in a microwave reactor.

According to another preferred embodiment of the present disclosure, the rutile has a purity of 91 wt % or more.

Technical Effects

Advantageous effects of the present disclosure are in that:

The artificial rutile prepared by using the method according to the present disclosure fully conforms to requirements of the chlorination method for producing titanium dioxide, and the method can be embodied by using various starting materials, compared with the related art. By means of microwave heating, the equipment investment needed by the method is low (for example reduce by 17% compared with the related art), and the energy consumption is low (for example reduce by 25% compared with the related art);

The artificial rutile has a purity of 91% or more, byproducts are fewer, and the environmental pollution caused is low; and The present disclosure conforms to requirements of energy conservation and emission reduction as well as clean metallurgy.

DETAILED DESCRIPTION OF EXEMPLARY EMBODIMENTS

The present disclosure will be described in more detail hereinafter.

The present disclosure relates to a method for preparing artificial rutile from an acid-soluble titanium slag.

An acid-soluble titanium slag containing a modifier added thereto is radiated using microwave in the present disclosure. Firstly, the radiation using microwave may generate substantial intergranular cracks inside of the acid-soluble titanium slag, and the cracks may promote infiltration of a leaching agent into the acid-soluble titanium slag such that the acid-soluble titanium slag is easy leached. Secondly, the additive has a strong disruptive force to silicate minerals so that the dissolving-out efficiency of impurities is improved, thereby improving a purity of the artificial rutile.

The method includes:

Step A, grinding:

An acid-soluble titanium slag is ground using a grinding device so that 80 wt % or more of the slag has a particle size of −100 mesh, thereby obtaining an acid-soluble titanium slag powder.

The acid-soluble titanium slag used in the present disclosure is a by-product obtained by smelting ilmenite in an electric furnace. The chemical composition of the acid-soluble titanium slag used in the present disclosure includes:

$TiO_2$ 72.0 wt % or more;
$Al_2O_3$ 2.2 wt % or less;
$SiO_2$ 9.6 wt % or less;
MgO 1.5 wt % or less; and
CaO 0.5 wt % or less.

The content of $TiO_2$ is measured by using an aluminum reduction method according to Chinese Standard GB/T1706-2006. The content of $Al_2O_3$ is measured by using an EDTA complexation fluoride salt titration method according to Chinese Standard GB15892-2009. The content of $SiO_2$ is measured by using a perchloric acid dehydration gravimetric method according to Chinese Standard YB/T190.1-2001. The content of MgO is measured by using a CyDTA titration method according to Chinese Standard YB/T 190.4-2001. The content of CaO is measured by using an atomic absorption spectrometry method according to Chinese Standard YSBC19811-2000.

Grinding and sieving processes are performed by existing grinding devices and sieving devices, respectively. For example, a grinding device sold from Nanchang General Assay & Sample Preparing Equipment Co., Ltd. under a trade name of Sealed-type Sample Preparing Grinder (JG100-3), and a sieving device sold from Zhejiang Shangyu City Daoxu Wusi Instrument Factory under a trade name of Standard Sieve are used.

The acid-soluble titanium slag used in the present disclosure is obtained from, for example, Yunnan Xingleng Mining Co., Ltd., Yunnan Xinli Nonferrous Metals Co., Ltd., Yuntong Group Titanium Industry Co., Ltd., or Pangang Group Titanium Industry Co., Ltd. The acid-soluble titanium slag may be also obtained commercially as long as the chemical composition thereof conforms to the requirement described above.

Step B, modifying:

Sodium carbonate as a modifier is added to the acid-soluble titanium slag powder obtained in Step A in an amount of 20-40 wt % based on a weight of the acid-soluble titanium slag powder, and they are mixed uniformly. The mixture is then radiated using microwave at a temperature of 750-850° C. in a microwave device, thereby obtaining a modified acid-soluble titanium slag.

In the present disclosure, the modifying should be understood as a treatment for changing a phase composition of the acid-soluble titanium slag.

In the present disclosure, the modifier should be understood as a chemical material having an ability to destroy a structure of a solid solution. Therefore, other chemical materials having the ability and having no negative effect on subsequent treatments may be used in the present disclosure, and may be within the scope of the present disclosure.

In addition to sodium carbonate, sodium hydroxide or a phosphate may be used as a modifier in the method of the present disclosure.

The phosphate includes disodium hydrogen phosphate, sodium dihydrogen phosphate, dipotassium hydrogen phosphate, potassium dihydrogen phosphate or ammonium phosphate.

In the present disclosure, if the amount of the modifier is less than 20 wt %, the reaction may be insufficient, and a part of the acid-soluble titanium slag may remain unreacted. If the amount of the modifier is higher than 40 wt %, a part of the modifier may remain unreacted, and consumption of the modifier may be increased. Therefore, the amount of the modifier ranging from 20 wt % to 40 wt %, preferably 25-35 wt %, and more preferably 28-32 wt % is proper.

The acid-soluble titanium slag powder should be modified using the modifier at a temperature of 750-850° C. for 1.5-2.5 hours.

If the temperature at which the acid-soluble titanium slag powder is modified using the modifier is lower than 750° C., the reaction may be insufficient, and a modifying degree is not enough. If the modifying temperature is higher than 850°

C., a sintering phenomenon may occur. Thus, the modifying temperature ranging from 750° C. to 850° C., and preferably 780-820° C., is proper.

Similarly, if the time during which the modifying (irradiating using microwave) is performed is less than 1.5 hours, the reaction may be incomplete. If the modifying time is longer than 2.5 hours, unnecessary and excess energy consumption may be incurred. Therefore, the modifying time ranging from 1.5 hours to 2.5 hours, preferably 1.7-2.3 hours, and more preferably 1.9-2.1 hours is proper.

The modified acid-soluble titanium slag obtained by Step B is identified by a method described above to find a basic chemical composition of a number of non-stoichiometric Na—Fe—Ti—O based solid solutions and Na—Mg—Ti—O based solid solutions.

The microwave device used in the modifying in the present disclosure may be a commercially available product, for example, a product sold by Kunming University of Science and Technology under a trade name of Microwave Chamber-type Reactor (HM type).

The microwave device used in the present disclosure has a frequency of 912-918 MHz, and a power of the microwave reactor should be selected according to an amount of the treated materials.

Step C, adding additive:

The modified acid-soluble titanium slag obtained by Step B is ground so that 80 wt % or more of the slag has a particle size of −160 mesh, and then ammonium bifluoride as an additive is added thereto, thereby obtaining an additive-containing acid-soluble titanium slag.

In Step C, a purpose of adding ammonium bifluoride as an additive is to destroy silicate mineral structures.

In Step C, ammonium bifluoride as an additive has an amount of 20-40 wt % based on a total weight of the modified acid-soluble titanium slag. If the amount of ammonium bifluoride is less than 20%, the reaction may be insufficient, and a part of the acid-soluble titanium slag may remain unreacted. If the amount of ammonium bifluoride as an additive is more than 40%, a part of the modifier may remain unreacted, and consumption thereof may be increased. Therefore, the amount of ammonium bifluoride ranging from 20 wt % to 40 wt %, preferably 24-36%, and more preferably 28-32% is proper.

Step D, removing impurities in an acid environment:

The additive-containing acid-soluble titanium slag obtained by Step C and a sulfuric acid or hydrochloric acid aqueous solution having a concentration of 15-30 wt % are uniformly mixed at a solid-liquid ratio of 1:4-6 to obtain a mixture and then impurities are removed from the additive-containing acid-soluble titanium slag at a boiling temperature for 90-120 min. The mixture is then filtered to obtain a solid; and the solid is washed, dried, and calcined at a temperature of 900-1000° C. to obtain the rutile. It should be noted that the solid-liquid ratio of the additive-containing acid-soluble titanium slag and the sulfuric acid or hydrochloric acid aqueous solution is calculated by a weight ratio.

The sulfuric acid or hydrochloric acid aqueous solution is used to remove impurities from the modified acid-soluble titanium slag in Step D. The removed impurities include, for example, $Fe_2O_3$, $CaO$, $MgO$, $Al_2O_3$ and the like.

In Step D, if the concentration of the sulfuric acid or hydrochloric acid aqueous solution exceeds the above range, leaching effect of the impurities from the modified acid-soluble titanium slag is deteriorated. The concentration is preferably 18-27%, and more preferably 21-24%.

According to the disclosure, if the solid-liquid ratio of the modified acid-soluble titanium slag to the inorganic acid aqueous solution is higher than 1:4, the leaching acid may become saturated quickly and the leaching cannot be continued. If the solid-liquid ratio of the modified acid-soluble titanium slag to the inorganic acid aqueous solution is lower than 1:6, a volume of a reaction vessel may be increased and the operability may become difficult. Therefore, the solid-liquid ratio of 1:4-6, preferably 1:4.5-5.5, and more preferably 1:4.8-5.2, between the modified acid-soluble titanium slag and the inorganic acid aqueous solution is proper.

In Step D, a device used for removing impurities in an acid environment is, for example, a constant-temperature water bath, for example sold by Gongyi City Yuhua Instrument Co., Ltd. under a trade name of Constant-temperature Heating Magnetic Stirrer (DF-101S).

In Step D, a device used for filtrating is a commercially available product, for example, a product sold by METTLER TOLEDO Instruments, Inc. under a trade name of Circulating Water Vacuum Pump (SHZ-D (III)).

A device used for washing is a commercially available product, for example, a product sold by METTLER TOLEDO Instruments, Inc. under a trade name of Circulating Water Vacuum Pump (SHZ-D (III)). The used detergent is generally water or other suitable solvents. The washing process is preformed until the pH value of filtrate of the acid leaching residual is 6.5-7.5, by a traditional way in which a solid product is washed several times with a small amount of detergent per time.

A drying device used in the disclosure is a commercially available product, for example, a product sold by Shanghai Boxun Industrial Equipment Co., Ltd. under a trade name of Digital Display Drying Oven (DZX-9030MBE).

In Step D, if the calcining temperature is lower than 900° C., a part of anatase $TiO_2$ may not be transformed in terms of crystal form. If the calcining temperature is higher than 1000° C., a sintering phenomenon may occur. Therefore, the calcining temperature of 900-1000° C., preferably 930-960° C. is proper. The calcining process is performed at a temperature of 900-1000° C. for 1.0-3.0 hours.

A calcining device used in the disclosure is a commercially available product, for example, a product sold by Kunming University of Science and Technology under a trade name of Microwave Chamber-type Reactor (HM type).

The product obtained by the calcining process is qualitatively and quantitatively characterized by X-ray diffraction.

A device used for X-ray diffraction analyzing is an X-ray diffraction analyzer (D/Max 2200 X) manufactured by Rigaku Company (Japan). The analysis is performed by using a graphite monochromator filter in a θ~2θ step scanning mode under a condition that a tube voltage is 35 kV, a tube current is 20 mA, and a scan speed is 3°/min in a range of 3~100°.

Figure 1:
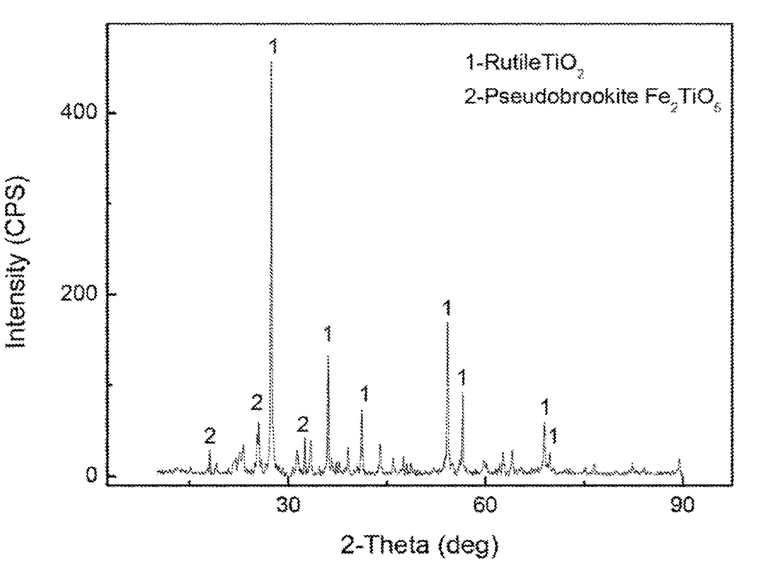
FIG. 1 is an X-ray diffraction diagram of rutile prepared using a method according to the present disclosure.

The result of the X-ray diffraction analysis is shown in FIG. 1. It is confirmed from FIG. 1 that a product obtained by the calcining process is mainly rutile.

Calculation is performed using the X-ray diffraction pattern obtained by a continuous scanning method using $SiO_2$ as a standard substance, according to the Bragg equation ($2d \sin \theta = \lambda$), and it is confirmed through the calculation that the product is artificial rutile with a $TiO_2$ purity of 91% or more.

Hereinafter, the present disclosure will be understood more readily by following embodiments.

Example 1. Preparation of Artificial Rutile

Example 1 includes:
Step A, grinding

An acid-soluble titanium slag obtained from Yunnan Xingleng Mining Co., Ltd. was identified by a method described in the present specification to find a chemical composition of the slag including 72.0 wt % of $TiO_2$, 9.5 wt % of $SiO_2$, 1.5 wt % of MgO and 0.5 wt % of CaO. An acid-soluble titanium slag powder was obtained by grinding the acid-soluble titanium slag so that 80 wt % or more of the slag had a particle size of −100 mesh, using a grinding device sold by Nanchang General Assay & Sample Preparing Equipment Co., Ltd. under a trade name of Sealed-type Sample Preparing Grinder (JG100-3); and then Step B, modifying Sodium carbonate as a modifier was added to the acid-soluble titanium slag powder obtained by Step A in an amount of 35 wt % based on the weight of the acid-soluble titanium slag powder, and mixed uniformly. The mixture was radiated using microwave at a frequency of 912 MHz at a temperature of 800° C. for 2.3 hours in a microwave device sold by Kunming University of Science and Technology under a trade name of Microwave Chamber-type Reactor (HM type), thereby obtaining a modified titanium slag. The modified titanium slag was identified by a method described in the present specification to find a basic chemical composition of $Na_2Fe_2Ti_6O_{16}$ and $Fe_2Ti_2O_5$; and next Step C, adding an additive Ammonium bifluoride as an additive was added to the modified titanium slag obtained by Step B in an amount of 24 wt % based on the total weight of the modified titanium slag, thereby obtaining an additive-containing acid-soluble titanium slag. The additive-containing acid-soluble titanium slag was identified by a method described in the present specification to find a basic chemical composition of $Na_2Fe_2Ti_6O_{16}$, $Fe_2Ti_2O_5$ and $NH_4HF_2$; and Step D, removing impurities in an acid environment The additive-containing titanium slag obtained by Step C and a sulfuric acid aqueous solution having a concentration of 18 wt % were uniformly mixed at a solid-liquid ratio of 1:4.8 to obtain a mixture and then impurities were removed from the additive-containing titanium slag at a boiling temperature for 90 min, using a constant-temperature water bath sold by Gongyi City Yuhua Instrument Co., Ltd. under a trade name of Constant-temperature Heating Magnetic Stirrer (DF-101S). The mixture was filtered using a filter device sold by METTLER TOLEDO Instruments, Inc. under a trade name of Circulating Water Vacuum Pump (SHZ-D (III)) to obtain a solid. The solid was then washed twice using water at a liquid-solid ratio of 3:1. The solid was then dried at a temperature of 95° C. for 1.0 hour in a drying device sold by Shanghai Boxun Industrial Equipment Co., Ltd. under a trade name of Digital Display Drying Oven (DZX-9030MBE). The solid was then calcined at a temperature of 960° C. for 1.0 hour to obtain a product. The product was identified through X-ray diffraction as artificial rutile containing 92.0 wt % of $TiO_2$, 0.26 wt % of CaO and 0.88 wt % of MgO.

Example 2. Preparation of Artificial Rutile

Example 2 includes:
Step A, grinding

An acid-soluble titanium slag obtained from Yuntong Group Titanium Industry Co., Ltd. was identified by a method described in the present specification to find a chemical composition of the slag including 72.6 wt % of $TiO_2$, 9.4 wt % of $SiO_2$, 1.2 wt % of MgO and 0.3 wt % of CaO. An acid-soluble titanium slag powder was obtained by grinding the acid-soluble titanium slag so that 80 wt % or more of the slag had a particle size of −100 mesh, using a grinding device sold by Nanchang General Assay & Sample Preparing Equipment Co., Ltd. under a trade name of Sealed-type Sample Preparing Grinder (JG100-3); and then Step B, modifying Sodium hydroxide as a modifier was added to the acid-soluble titanium slag powder obtained by Step A in an amount of 20 wt % based on the weight of the acid-soluble titanium slag powder, and mixed uniformly. The mixture was radiated using microwave at a frequency of 915 MHz at a temperature of 750° C. for 1.5 hours in a microwave device sold by Kunming University of Science and Technology under a trade name of Microwave Chamber-type Reactor (HM type), thereby obtaining a modified titanium slag. The modified titanium slag was identified by a method described in the present specification to find a basic chemical composition of $Na_2TiO_3$ and $Fe_2Ti_2O_5$; and next Step C, adding an additive Ammonium bifluoride as an additive was added to the modified titanium slag obtained by Step B in an amount of 36 wt % based on the total weight of the modified titanium slag, thereby obtaining an additive-containing acid-soluble titanium slag. The additive-containing acid-soluble titanium slag was identified by a method described in the present specification to find a basic chemical composition of $Na_2TiO_3$, $Fe_2Ti_2O_5$ and $NH_4HF_2$; and Step D, removing impurities in an acid environment The additive-containing titanium slag obtained by Step C and a sulfuric acid aqueous solution having a concentration of 27 wt % were uniformly mixed at a solid-liquid ratio of 1:5.2 to obtain a mixture and then impurities were removed from the additive-containing titanium slag at a boiling temperature for 100 min, using a constant-temperature water bath sold by Gongyi City Yuhua Instrument Co., Ltd. under a trade name of Constant-temperature Heating Magnetic Stirrer (DF-101S). The mixture was filtered using a filter device sold by METTLER TOLEDO Instruments, Inc. under a trade name of Circulating Water Vacuum Pump (SHZ-D (III)) to obtain a solid. The solid was then washed three times using water at a liquid-solid ratio of 5:1. The solid was then dried at a temperature of 100° C. for 1.2 hours in a drying device sold by Shanghai Boxun Industrial Equipment Co., Ltd. under a trade name of Digital Display Drying Oven (DZX-9030MBE). The solid was then calcined at a temperature of 900° C. for 2.0 hours to obtain a product. The product was identified through X-ray diffraction as artificial rutile containing 92.2 wt % of $TiO_2$, 0.23 wt % of CaO and 0.86 wt % of MgO.

Example 3. Preparation of Artificial Rutile

Example 3 includes:
Step A, grinding

An acid-soluble titanium slag obtained from Yunnan Xinli Nonferrous Metals Co., Ltd. was identified by a method described in the present specification to find a chemical composition of the slag including 72.0 wt % of $TiO_2$, 9.0 wt % of $SiO_2$, 0.98 wt % of MgO and 0.45 wt % of CaO. An acid-soluble titanium slag powder was obtained by grinding the acid-soluble titanium slag so that 80 wt % or more of the slag had a particle size of −100 mesh, using a grinding device sold by Nanchang General Assay & Sample Preparing Equipment Co., Ltd. under a trade name of Sealed-type Sample Preparing Grinder (JG100-3); and then Step B, modifying Disodium hydrogen phosphate as a modifier was added to the acid-soluble titanium slag powder obtained by Step A in an amount of 25 wt % based on the weight of the acid-soluble titanium slag powder, and mixed uniformly. The mixture was radiated using microwave at a frequency of 918 MHz at a temperature of 780° C. for 2.5 hours in a microwave device sold by Kunming University of Science and Technology under a trade name of Microwave Chamber-type Reactor (HM type), thereby obtaining a modified titanium slag. The modified titanium slag was identified by a method described in the present specification to find a basic chemical composition of rutile-type $TiO_2$, $Na_3PO_4$ and $Fe_2Ti_2O_5$; and next Step C, adding an additive Ammonium bifluoride as an additive was added to the modified titanium slag obtained by Step B in an amount of 20 wt % based on the total weight of the modified titanium slag, thereby obtaining an additive-containing acid-soluble titanium slag. The additive-containing acid-soluble titanium slag was identified by a method described in the present specification to find a basic chemical composition of rutile-type $TiO_2$, $Na_3PO_4$, $Fe_2TiO_5$ and $NH_4HF_2$; and Step D, removing impurities in an acid environment The additive-containing titanium slag obtained by Step C and a sulfuric acid or hydrochloric acid aqueous solution having a concentration of 15 wt % were uniformly mixed at a solid-liquid ratio of 1:4.0 to obtain a mixture and then impurities were removed from the additive-containing titanium slag at a boiling temperature for 120 min, using a constant-temperature water bath sold by Gongyi City Yuhua Instrument Co., Ltd. under a trade name of Constant-temperature Heating Magnetic Stirrer (DF-101S). The mixture was filtered using a filter device sold by METTLER TOLEDO Instruments, Inc. under a trade name of Circulating Water Vacuum Pump (SHZ-D (III)) to obtain a solid. The solid was then washed four times using water at a liquid-solid ratio of 4:1. The solid was then dried at a temperature of 105° C. for 0.8 hour in a drying device sold by Shanghai Boxun Industrial Equipment Co., Ltd. under a trade name of Digital Display Drying Oven (DZX-9030MBE). The solid was then calcined at a temperature of 1000° C. for 3.0 hours to obtain a product. The product was identified through X-ray diffraction as artificial rutile containing 91.8 wt % of $TiO_2$, 0.20 wt % of CaO and 0.86 wt % of MgO.

Example 4. Preparation of Artificial Rutile

Example 4 includes:

Step A, grinding

An acid-soluble titanium slag obtained from Pangang Group Titanium Industry Co., Ltd. was identified by a method described in the present specification to find a chemical composition of the slag including 72.8 wt % of $TiO_2$, 9.0 wt % of $SiO_2$, 0.86 wt % of MgO and 0.4 wt % of CaO. An acid-soluble titanium slag powder was obtained by grinding the acid-soluble titanium slag so that 80 wt % or more of the slag had a particle size of −100 mesh, using a grinding device sold by Nanchang General Assay & Sample Preparing Equipment Co., Ltd. under a trade name of Sealed-type Sample Preparing Grinder (JG100-3); and then Step B, modifying Dipotassium hydrogen phosphate as a modifier was added to the acid-soluble titanium slag powder obtained by Step A in an amount of 40 wt % based on the weight of the acid-soluble titanium slag powder, and mixed uniformly. The mixture was radiated using microwave at a frequency of 912 MHz at a temperature of 850° C. for 1.7 hours in a microwave device sold by Kunming University of Science and Technology under a trade name of Microwave Chamber-type Reactor (HM type), thereby obtaining a modified titanium slag. The modified titanium slag was identified by a method described in the present specification to find a basic chemical composition of rutile-type $TiO_2$, $K_3PO_4$ and $Fe_2Ti_2O_5$; and next Step C, adding an additive Ammonium bifluoride as an additive was added to the modified titanium slag obtained by Step B in an amount of 40 wt % based on the total weight of the modified titanium slag, thereby obtaining an additive-containing acid-soluble titanium slag. The additive-containing acid-soluble titanium slag was identified by a method described in the present specification to find a basic chemical composition of rutile-type $TiO_2$, $K_3PO_4$, $Fe_2Ti_2O_5$ and $NH_4HF_2$; and Step D, removing impurities in an acid environment The additive-containing titanium slag obtained by Step C and a hydrochloric acid aqueous solution having a concentration of 30 wt % were uniformly mixed at a solid-liquid ratio of 1:6.0 to obtain a mixture and then impurities were removed from the additive-containing titanium slag at a boiling temperature for 110 min, using a constant-temperature water bath sold by Gongyi City Yuhua Instrument Co., Ltd. under a trade name of Constant-temperature Heating Magnetic Stirrer (DF-101S). The mixture was filtered using a filter device sold by METTLER TOLEDO Instruments, Inc. under a trade name of Circulating Water Vacuum Pump (SHZ-D (III)) to obtain a solid. The solid was then washed twice using water at a liquid-solid ratio of 3:1. The solid was then dried at a temperature of 95° C. for 1.0 hour in a drying device sold by Shanghai Boxun Industrial Equipment Co., Ltd. under a trade name of Digital Display Drying Oven (DZX-9030MBE). The solid was then calcined at a temperature of 930° C. for 1.5 hours to obtain a product. The product was identified through X-ray diffraction as artificial rutile containing 93.0 wt % of $TiO_2$, 0.20 wt % of CaO and 0.82 wt % of MgO.

Example 5. Preparation of Artificial Rutile

Example 5 includes:

Step A, grinding

An acid-soluble titanium slag obtained from Pangang Group Titanium Industry Co., Ltd. was identified by a method described in the present specification to find a chemical composition of the slag including 72.8 wt % of $TiO_2$, 8.2 wt % of $SiO_2$, 0.89 wt % of MgO and 0.2 wt % of CaO. An acid-soluble titanium slag powder was obtained by grinding the acid-soluble titanium slag so that 80 wt % or more of the slag had a particle size of −100 mesh, using a grinding device sold by Nanchang General Assay & Sample Preparing Equipment Co., Ltd. under a trade name of Sealed-type Sample Preparing Grinder (JG100-3); and then Step B, modifying Ammonium phosphate as a modifier was added to the acid-soluble titanium slag powder obtained by Step A in an amount of 28 wt % based on the weight of the acid-soluble titanium slag powder, and mixed uniformly. The mixture was radiated using microwave at a frequency of 915 MHz at a temperature of 820° C. for 1.9 hours in a microwave device sold by Kunming University of Science and Technology under a trade name of Microwave Chamber-type Reactor (HM type), thereby obtaining a modified titanium slag. The modified titanium slag was identified by a method described in the present specification to find a basic chemical composition of rutile-type $TiO_2$ and $Fe_2Ti_2O_5$; and next Step C, adding an additive Ammonium bifluoride as an additive was added to the modified titanium slag obtained by Step B in an amount of 40 wt % based on the total weight of the modified titanium slag, thereby obtaining an additive-containing acid-soluble titanium slag. The additive-containing acid-soluble titanium slag was identified by a method described in the present specification to find a basic chemical composition of rutile-type $TiO_2$, $Fe_2Ti_2O_5$ and $NH_4HF_2$; and Step D, removing impurities in an acid environment The additive-containing titanium slag obtained by Step C and a hydrochloric acid aqueous solution having a concentration of 21 wt % were uniformly mixed at a solid-liquid ratio of 1:4.5 to obtain a mixture and then impurities were removed from the additive-containing titanium slag at a boiling temperature for 105 min, using a constant-temperature water bath sold by Gongyi City Yuhua Instrument Co., Ltd. under a trade name of Constant-temperature Heating Magnetic Stirrer (DF-101S). The mixture was filtered using a filter device sold by METTLER TOLEDO Instruments, Inc. under a trade name of Circulating Water Vacuum Pump (SHZ-D (III)) to obtain a solid. The solid was then washed three times using water at a liquid-solid ratio of 4:1. The solid was then dried at a temperature of 100° C. for 1.5 hours in a drying device sold by Shanghai Boxun Industrial Equipment Co., Ltd. under a trade name of Digital Display Drying Oven (DZX-9030MBE). The solid was then calcined at a temperature of 960° C. for 2.5 hours to obtain a product. The product was identified through X-ray diffraction as artificial rutile containing 92.3 wt % of $TiO_2$, 0.25 wt % of CaO and 0.86 wt % of MgO.

Example 6. Preparation of Artificial Rutile

Example 6 includes:
Step A, grinding

An acid-soluble titanium slag obtained from Yuntong Group Titanium Industry Co., Ltd. was identified by a method described in the present specification to find a chemical composition of the slag including 72.0 wt % of $TiO_2$, 9.0 wt % of $SiO_2$, 1.3 wt % of MgO and 0.3 wt % of CaO. An acid-soluble titanium slag powder was obtained by grinding the acid-soluble titanium slag so that 80 wt % or more of the slag had a particle size of −100 mesh, using a grinding device sold by Nanchang General Assay & Sample Preparing Equipment Co., Ltd. under a trade name of Sealed-type Sample Preparing Grinder (JG100-3); and then Step B, modifying Sodium carbonate as a modifier was added to the acid-soluble titanium slag powder obtained by Step A in an amount of 32 wt % based on the weight of the acid-soluble titanium slag powder, and mixed uniformly. The mixture was radiated using microwave at a frequency of 918 MHz at a temperature of 800° C. for 2.1 hours in a microwave device sold by Kunming University of Science and Technology under a trade name of Microwave Chamber-type Reactor (HM type), thereby obtaining a modified titanium slag. The modified titanium slag was identified by a method described in the present specification to find a basic chemical composition of $Na_2Fe_2Ti_6O_{16}$, $Na_{0.36}Fe_{0.69}Ti_{3.3408}$ and $Fe_2Ti_2O_5$; and next Step C, adding an additive Ammonium bifluoride as an additive was added to the modified titanium slag obtained by Step B in an amount of 32 wt % based on the total weight of the modified titanium slag, thereby obtaining an additive-containing acid-soluble titanium slag. The additive-containing acid-soluble titanium slag was identified by a method described in the present specification to find a basic chemical composition of $Na_2Fe_2Ti_6O_{16}$, $Na_{0.36}Fe_{0.69}Ti_{3.3408}$, $Fe_2Ti_2O_5$ and $NH_4HF_2$; and Step D, removing impurities in an acid environment The additive-containing titanium slag obtained by Step C and a hydrochloric acid aqueous solution having a concentration of 24 wt % were uniformly mixed at a solid-liquid ratio of 1:5.5 to obtain a mixture and then impurities were removed from the additive-containing titanium slag at a boiling temperature for 115 min, using a constant-temperature water bath sold by Gongyi City Yuhua Instrument Co., Ltd. under a trade name of Constant-temperature Heating Magnetic Stirrer (DF-101S). The mixture was filtered using a filter device sold by METTLER TOLEDO Instruments, Inc. under a trade name of Circulating Water Vacuum Pump (SHZ-D (III)) to obtain a solid. The solid was then washed four times using water at a liquid-solid ratio of 4:1. The solid was then dried at a temperature of 105° C. for 1.2 hours in a drying device sold by Shanghai Boxun Industrial Equipment Co., Ltd. under a trade name of Digital Display Drying Oven (DZX-9030MBE). The solid was then calcined at a temperature of 1000° C. for 2.0 hours to obtain a product. The product was identified through X-ray diffraction as artificial rutile containing 91.1 wt % of $TiO_2$, 0.25 wt % of CaO and 0.89 wt % of MgO.

Comparative Example 1. Preparation of Artificial Rutile

Comparative Example 1 includes:
Step A, grinding

An acid-soluble titanium slag obtained from Yunnan Xingleng Mining Co., Ltd. was identified by a method described in the present specification to find a chemical composition of the slag including 72.0 wt % of $TiO_2$, 9.5 wt % of $SiO_2$, 1.5 wt % of MgO and 0.5 wt % of CaO. An acid-soluble titanium slag powder was obtained by grinding the acid-soluble titanium slag so that 80 wt % or more of the slag had a particle size of −100 mesh, using a grinding device sold by Nanchang General Assay & Sample Preparing Equipment Co., Ltd. under a trade name of Sealed-type Sample Preparing Grinder (JG100-3); and then Step B, modifying Sodium carbonate as a modifier was added to the acid-soluble titanium slag powder obtained by Step A in an amount of 35 wt % based on the weight of the acid-soluble titanium slag powder, and mixed uniformly. The mixture was radiated using microwave at a temperature of 800° C. for 2.3 hours in an electric resistance furnace, thereby obtaining a modified titanium slag. The modified titanium slag was identified by a method described in the present specification to find a basic chemical composition of $Na_2Fe_2Ti_6O_{16}$ and $Fe_2Ti_2O_5$; and next Step C, adding an additive Ammonium bifluoride as an additive was added to the modified titanium slag obtained by Step B in an amount of 24 wt % based on the total weight of the modified titanium slag, thereby obtaining an additive-containing acid-soluble titanium slag. The additive-containing acid-soluble titanium slag was identified by a method described in the present specification to find a basic chemical composition of $Na_2Fe_2Ti_6O_{16}$, $Fe_2Ti_2O_5$ and $NH_4HF_2$; and Step D, removing impurities in an acid environment The additive-containing titanium slag obtained by Step C and a sulfuric acid aqueous solution having a concentration of 18 wt % were uniformly mixed at a solid-liquid ratio of 1:4.8 to obtain a mixture and then impurities were removed from the additive-containing titanium slag at a boiling temperature for 90 min, using a constant-temperature water bath sold by Gongyi City Yuhua Instrument Co., Ltd. under a trade name of Constant-temperature Heating Magnetic Stirrer (DF-101S). The mixture was filtered using a filter device sold by METTLER TOLEDO Instruments, Inc. under a trade name of Circulating Water Vacuum Pump (SHZ-D (III)) to obtain a solid. The solid was then washed twice using water at a liquid-solid ratio of 3:1. The solid was then dried at a temperature of 95° C. for 1.0 hour in a drying device sold by Shanghai Boxun Industrial Equipment Co., Ltd. under a trade name of Digital Display Drying Oven (DZX-9030MBE). The solid was then calcined at a temperature of 960° C. for 1.0 hour to obtain a product. The product was identified through X-ray diffraction as artificial rutile containing 82.29 wt % of $TiO_2$, 0.36 wt % of CaO and 0.96 wt % of MgO.

Comparative Example 2. Preparation of Artificial Rutile

Comparative Example 2 includes:
Step A, grinding

An acid-soluble titanium slag obtained from Yunnan Xinli Nonferrous Metals Co., Ltd. was identified by a method described in the present specification to find a chemical composition of the slag including 72.6 wt % of $TiO_2$, 9.4 wt % of $SiO_2$, 1.2 wt % of MgO and 0.3 wt % of CaO. An acid-soluble titanium slag powder was obtained by grinding the acid-soluble titanium slag so that 80 wt % or more of the slag had a particle size of −100 mesh, using a grinding device sold by Nanchang General Assay & Sample Preparing Equipment Co., Ltd. under a trade name of Sealed-type Sample Preparing Grinder (JG100-3); and then Step B, modifying Sodium hydroxide as a modifier was added to the acid-soluble titanium slag powder obtained by Step A in an amount of 20 wt % based on the weight of the acid-soluble titanium slag powder, and mixed uniformly. The mixture was radiated using microwave at a temperature of 750° C. for 1.5 hours in an electric resistance furnace, thereby obtaining a modified titanium slag. The modified titanium slag was identified by a method described in the present specification to find a basic chemical composition of $Na_2TiO_3$ and $Fe_2Ti_2O_5$; and next Step C, adding an additive Ammonium bifluoride as an additive was added to the modified titanium slag obtained by Step B in an amount of 36 wt % based on the total weight of the modified titanium slag, thereby obtaining an additive-containing acid-soluble titanium slag. The additive-containing acid-soluble titanium slag was identified by a method described in the present specification to find a basic chemical composition of $Na_2TiO_3$, $Fe_2Ti_2O_5$ and $NH_4HF_2$; and Step D, removing impurities in an acid environment The additive-containing titanium slag obtained by Step C and a sulfuric acid aqueous solution having a concentration of 27 wt % were uniformly mixed at a solid-liquid ratio of 1:5.2 to obtain a mixture and then impurities were removed from the additive-containing titanium slag at a boiling temperature for 100 min, using a constant-temperature water bath sold by Gongyi City Yuhua Instrument Co., Ltd. under a trade name of Constant-temperature Heating Magnetic Stirrer (DF-101S). The mixture was filtered using a filter device sold by METTLER TOLEDO Instruments, Inc. under a trade name of Circulating Water Vacuum Pump (SHZ-D (III)) to obtain a solid. The solid was then washed three times using water at a liquid-solid ratio of 5:1. The solid was then dried at a temperature of 100° C. for 1.2 hours in a drying device sold by Shanghai Boxun Industrial Equipment Co., Ltd. under a trade name of Digital Display Drying Oven (DZX-9030MBE). The solid was then calcined at a temperature of 900° C. for 2.0 hours to obtain a product. The product was identified through X-ray diffraction as artificial rutile containing 89.62 wt % of $TiO_2$, 0.28 wt % of CaO and 0.98 wt % of MgO.

Comparative Example 3. Preparation of Artificial Rutile

Comparative Example 3 includes:
Step A, grinding

An acid-soluble titanium slag obtained from Yuntong Group Titanium Industry Co., Ltd. was identified by a method described in the present specification to find a chemical composition of the slag including 72.0 wt % of $TiO_2$, 9.0 wt % of $SiO_2$, 0.98 wt % of MgO and 0.45 wt % of CaO. An acid-soluble titanium slag powder was obtained by grinding the acid-soluble titanium slag so that 80 wt % or more of the slag had a particle size of −100 mesh, using a grinding device sold by Nanchang General Assay & Sample Preparing Equipment Co., Ltd. under a trade name of Sealed-type Sample Preparing Grinder (JG100-3); and then Step B, modifying Disodium hydrogen phosphate as a modifier was added to the acid-soluble titanium slag powder obtained by Step A in an amount of 25 wt % based on the weight of the acid-soluble titanium slag powder, and mixed uniformly. The mixture was radiated using microwave at a temperature of 780° C. for 2.5 hours in an electric resistance furnace, thereby obtaining a modified titanium slag. The modified titanium slag was identified by a method described in the present specification to find a basic chemical composition of rutile-type $TiO_2$, $Na_3PO_4$ and $Fe_2Ti_2O_5$; and next Step C, adding an additive Ammonium bifluoride as an additive was added to the modified titanium slag obtained by Step B in an amount of 20 wt % based on the total weight of the modified titanium slag, thereby obtaining an additive-containing acid-soluble titanium slag. The additive-containing acid-soluble titanium slag was identified by a method described in the present specification to find a basic chemical composition of rutile-type $TiO_2$, $Na_3PO_4$, $Fe_2TiO_5$ and $NH_4HF_2$; and Step D, removing impurities in an acid environment The additive-containing titanium slag obtained by Step C and a sulfuric acid or hydrochloric acid aqueous solution having a concentration of 15 wt % were uniformly mixed at a solid-liquid ratio of 1:4.0 to obtain a mixture and then impurities were removed from the additive-containing titanium slag at a boiling temperature for 120 min, using a constant-temperature water bath sold by Gongyi City Yuhua Instrument Co., Ltd. under a trade name of Constant-temperature Heating Magnetic Stirrer (DF-101S). The mixture was filtered using a filter device sold by METTLER TOLEDO Instruments, Inc. under a trade name of Circulating Water Vacuum Pump (SHZ-D (III)) to obtain a solid. The solid was then washed four times using water at a liquid-solid ratio of 4:1. The solid was then dried at a temperature of 105° C. for 0.8 hour in a drying device sold by Shanghai Boxun Industrial Equipment Co., Ltd. under a trade name of Digital Display Drying Oven (DZX-9030MBE). The solid was then calcined at a temperature of 1000° C. for 3.0 hours to obtain a product. The product was identified through X-ray diffraction as artificial rutile containing 81.47 wt % of $TiO_2$, 0.32 wt % of CaO and 0.91 wt % of MgO.

It was confirmed by comparing results of Examples 1-3 with those of Comparative Examples 1-3 (wherein no microwave device was used) that a purity of the artificial rutile obtained according to the method of the present disclosure is higher than that of the artificial rutile obtained according to Comparative Examples by 11.53%, which was surprised.

Comparative Example 4. Preparation of Artificial Rutile

Comparative Example 4 includes:
Step A, grinding
An acid-soluble titanium slag obtained from Yunnan Xinli Nonferrous Metals Co., Ltd. was identified by a method described in the present specification to find a chemical composition of the slag including 72.8 wt % of $TiO_2$, 9.0 wt % of $SiO_2$, 0.86 wt % of MgO and 0.4 wt % of CaO. An acid-soluble titanium slag powder was obtained by grinding the acid-soluble titanium slag so that 80 wt % or more of the slag had a particle size of −100 mesh, using a grinding device sold by Nanchang General Assay & Sample Preparing Equipment Co., Ltd. under a trade name of Sealed-type Sample Preparing Grinder (JG100-3); and then
Step B, Modifying
Dipotassium hydrogen phosphate as a modifier was added to the acid-soluble titanium slag powder obtained by Step A in an amount of 40 wt % based on the weight of the acid-soluble titanium slag powder, and mixed uniformly. The mixture was radiated using microwave at a temperature of 850° C. for 1.7 hours in an electric resistance furnace, thereby obtaining a modified titanium slag. The modified titanium slag was identified by a method described in the present specification to find a basic chemical composition of rutile-type $TiO_2$, $K_3PO_4$ and $Fe_2Ti_2O_5$; and next
Step C, removing impurities in an acid environment
An additive-containing titanium slag obtained by Step C and a hydrochloric acid aqueous solution having a concentration of 30 wt % were uniformly mixed at a solid-liquid ratio of 1:6.0 to obtain a mixture and then impurities were removed from the additive-containing titanium slag at a boiling temperature for 110 min, using a constant-temperature water bath sold by Gongyi City Yuhua Instrument Co., Ltd. under a trade name of Constant-temperature Heating Magnetic Stirrer (DF-101S). The mixture was filtered using a filter device sold by METTLER TOLEDO Instruments, Inc. under a trade name of Circulating Water Vacuum Pump (SHZ-D (III)) to obtain a solid. The solid was then washed twice using water at a liquid-solid ratio of 3:1. The solid was then dried at a temperature of 95° C. for 1.0 hour in a drying device sold by Shanghai Boxun Industrial Equipment Co., Ltd. under a trade name of Digital Display Drying Oven (DZX-9030MBE). The solid was then calcined at a temperature of 930° C. for 1.5 hours to obtain a product. The product was identified through X-ray diffraction as artificial rutile containing 78.0 wt % of $TiO_2$, 0.35 wt % of CaO and 0.93 wt % of MgO.

Comparative Example 5. Preparation of Artificial Rutile

Comparative Example 5 includes:
Step A, grinding
An acid-soluble titanium slag obtained from Pangang Group Titanium Industry Co., Ltd. was identified by a method described in the present specification to find a chemical composition of the slag including 72.8 wt % of $TiO_2$, 8.2 wt % of $SiO_2$, 0.89 wt % of MgO and 0.2 wt % of CaO. An acid-soluble titanium slag powder was obtained by grinding the acid-soluble titanium slag so that 80 wt % or more of the slag had a particle size of −100 mesh, using a grinding device sold by Nanchang General Assay & Sample Preparing Equipment Co., Ltd. under a trade name of Sealed-type Sample Preparing Grinder (JG100-3); and then
Step B, Modifying
Ammonium phosphate as a modifier was added to the acid-soluble titanium slag powder obtained by Step A in an amount of 28 wt % based on the weight of the acid-soluble titanium slag powder, and mixed uniformly. The mixture was radiated using microwave at a temperature of 820° C. for 1.9 hours in an electric resistance furnace, thereby obtaining a modified titanium slag. The modified titanium slag was identified by a method described in the present specification to find a basic chemical composition of rutile-type $TiO_2$ and $Fe_2Ti_2O_5$; and next
Step C, removing impurities in an acid environment
An additive-containing titanium slag obtained by Step C and a hydrochloric acid aqueous solution having a concentration of 21 wt % were uniformly mixed at a solid-liquid ratio of 1:4.5 to obtain a mixture and then impurities were removed from the additive-containing titanium slag at a boiling temperature for 105 min, using a constant-temperature water bath sold by Gongyi City Yuhua Instrument Co., Ltd. under a trade name of Constant-temperature Heating Magnetic Stirrer (DF-101S). The mixture was filtered using a filter device sold by METTLER TOLEDO Instruments, Inc. under a trade name of Circulating Water Vacuum Pump (SHZ-D (III)) to obtain a solid. The solid was then washed three times using water at a liquid-solid ratio of 4:1. The solid was then dried at a temperature of 100° C. for 1.5 hours in a drying device sold by Shanghai Boxun Industrial Equipment Co., Ltd. under a trade name of Digital Display Drying Oven (DZX-9030MBE). The solid was then calcined at a temperature of 960° C. for 2.5 hours to obtain a product. The product was identified through X-ray diffraction as artificial rutile containing 76.3 wt % of $TiO_2$, 0.38 wt % of CaO and 1.06 wt % of MgO.

Comparative Example 6. Preparation of Artificial Rutile

Comparative Example 6 includes:
Step A, grinding
An acid-soluble titanium slag obtained from Yunnan Xinli Nonferrous Metals Co., Ltd. was identified by a method described in the present specification to find a chemical composition of the slag including 72.0 wt % of $TiO_2$, 9.0 wt % of $SiO_2$, 1.3 wt % of MgO and 0.3 wt % of CaO. An acid-soluble titanium slag powder was obtained by grinding the acid-soluble titanium slag so that 80 wt % or more of the slag had a particle size of −100 mesh, using a grinding device sold by Nanchang General Assay & Sample Preparing Equipment Co., Ltd. under a trade name of Sealed-type Sample Preparing Grinder (JG100-3); and then Step B, Modifying Sodium carbonate as a modifier was added to the acid-soluble titanium slag powder obtained by Step A in an amount of 32 wt % based on the weight of the acid-soluble titanium slag powder, and mixed uniformly. The mixture was radiated using microwave at a temperature of 800° C. for 2.1 hours in an electric resistance furnace, thereby obtaining a modified titanium slag. The modified titanium slag was identified by a method described in the present specification to find a basic chemical composition of $Na_2Fe_2Ti_6O_{16}$, $Na_{0.36}Fe_{0.69}Ti_{3.3408}$ and $Fe_2Ti_2O_5$; and Step C, removing impurities in an acid environment An additive-containing titanium slag obtained by Step C and a hydrochloric acid aqueous solution having a concentration of 24 wt % were uniformly mixed at a solid-liquid ratio of 1:5.5 to obtain a mixture and then impurities were removed from the additive-containing titanium slag at a boiling temperature for 115 min, using a constant-temperature water bath sold by Gongyi City Yuhua Instrument Co., Ltd. under a trade name of Constant-temperature Heating Magnetic Stirrer (DF-101S). The mixture was filtered using a filter device sold by METTLER TOLEDO Instruments, Inc. under a trade name of Circulating Water Vacuum Pump (SHZ-D (III)) to obtain a solid. The solid was then washed four times using water at a liquid-solid ratio of 4:1. The solid was then dried at a temperature of 105° C. for 1.2 hours in a drying device sold by Shanghai Boxun Industrial Equipment Co., Ltd. under a trade name of Digital Display Drying Oven (DZX-9030MBE). The solid was then calcined at a temperature of 1000° C. for 2.0 hours to obtain a product. The product was identified through X-ray diffraction as artificial rutile containing 72.1 wt % of $TiO_2$, 0.36 wt % of CaO and 1.19 wt % of MgO.

It was confirmed by comparing results of Examples 1-6 with those of Comparative Examples 4-6 (wherein no microwave device was used, and no ammonium bifluoride as an additive was used) that a purity of the artificial rutile obtained according to the method of the present disclosure is higher than that of the artificial rutile obtained according to Comparative Examples by 20.9%, which was surprised.

What is claimed is:

1. A method for preparing rutile from an acid-soluble titanium slag, comprising steps of:
   (i) grinding including:
   grinding the acid-soluble titanium slag using a grinding device so that 80 wt % or more of the slag has a particle size of −100 mesh, thereby obtaining an acid-soluble titanium slag powder; then
   (ii) modifying including:
   adding sodium carbonate as a modifier to the acid-soluble titanium slag powder obtained in step (i) in an amount of 20-40 wt % based on a weight of the acid-soluble titanium slag powder, mixing uniformly, and then radiating the mixture at a temperature of 750-850° C. in a microwave device, thereby obtaining a modified acid-soluble titanium slag,
   wherein the radiating is performed at a frequency of 912-918 MHz for 1.5-2.5 hours; then
   (iii) adding an additive including:
   grinding the modified acid-soluble titanium slag obtained in step (ii) so that 80 wt % or more of the slag has a particle size of −160 mesh, and adding ammonium bifluoride as an additive thereto, thereby obtaining an additive-containing acid-soluble titanium slag; and
   (iv) removing impurities in an acid environment and calcining including:
   uniformly mixing the additive-containing acid-soluble titanium slag obtained in step (iii) with a sulfuric acid or hydrochloric acid aqueous solution having a concentration of 15-30 wt % at a solid-liquid ratio of 1:4-6, removing impurities from the additive-containing acid-soluble titanium slag for 90-120 min at a boiling temperature, filtering, washing and drying the boiled slag, and then calcining at a temperature of 900-1000° C. to obtain the rutile.

2. The method of claim 1, wherein the acid-soluble titanium slag powder obtained in step (i) comprises 72.0 wt % or more of $TiO_2$, 2.2 wt % or less of $Al_2O_3$, 9.6 wt % or less of $SiO_2$, 1.5 wt % or less of MgO, and 0.5 wt % or less of CaO.

3. The method of claim 1, wherein the sodium carbonate added in step (ii) is in an amount of 25-35 wt % based on the weight of the acid-soluble titanium slag powder.

4. The method of claim 1, wherein the ammonium bifluoride added in step (iii) is in an amount of 20-40 wt % based on a total weight of the modified acid-soluble titanium slag.

5. The method of claim 1, wherein the calcining in step (iv) comprises calcining under a frequency of 912-9180 MHz for 28-32 min in a microwave reactor.

6. The method of claim 1, wherein the rutile has a purity of 91 wt % or more.

7. A method for preparing rutile from an acid-soluble titanium slag, comprising steps of:
   (i) grinding including:
   grinding the acid-soluble titanium slag using a grinding device so that 80 wt % or more of the slag has a particle size of −100 mesh, thereby obtaining an acid-soluble titanium slag powder; then
   (ii) modifying including:
   adding sodium hydroxide or a phosphate as a modifier to the acid-soluble titanium slag powder obtained in step (i) in an amount of 20-40 wt % based on a weight of the acid-soluble titanium slag powder, mixing uniformly, and then radiating the mixture at a temperature of 750-850° C. in a microwave device, thereby obtaining a modified acid-soluble titanium slag,
   wherein the radiating is performed at a frequency of 912-918 MHz for 1.5-2.5 hours; then
   (iii) adding an additive including:
   grinding the modified acid-soluble titanium slag obtained in step (ii) so that 80 wt % or more of the slag has a particle size of −160 mesh, and adding ammonium bifluoride as an additive thereto, thereby obtaining an additive-containing acid-soluble titanium slag; and
   (iv) removing impurities in an acid environment and calcining including:
   uniformly mixing the additive-containing acid-soluble titanium slag obtained in step (iii) with a sulfuric acid or hydrochloric acid aqueous solution having a concentration of 15-30 wt % at a solid-liquid ratio of 1:4-6, removing impurities from the additive-containing acid-soluble titanium slag for 90-120 min at a boiling temperature, filtering, washing and drying the boiled slag and then calcining at a temperature of 900-1000° C. to obtain the rutile.

8. The method of claim 7, wherein the phosphate comprises disodium hydrogen phosphate, sodium dihydrogen phosphate, dipotassium hydrogen phosphate, potassium dihydrogen phosphate, or ammonium phosphate.

9. The method of claim 7, wherein the acid-soluble titanium slag powder obtained in step (i) comprises 72.0 wt % or more of TiO$_2$, 2.2 wt % or less of Al$_2$O$_3$, 9.6 wt % or less of SiO$_2$, 1.5 wt % or less of MgO, and 0.5 wt % or less of CaO.

10. The method of claim 7, wherein the sodium hydroxide or the phosphate added in step (ii) is in an amount of 25-35 wt % based on the weight of the acid-soluble titanium slag powder.

11. The method of claim 7, wherein the ammonium bifluoride added in step (iii) is in an amount of 20-40 wt % based on a total weight of the modified acid-soluble titanium slag.

12. The method of claim 7, wherein the calcining in step (iv) comprises calcining under a frequency of 912-9180 MHz for 28-32 min in a microwave reactor.

13. The method of claim 7, wherein the rutile has a purity of 91 wt % or more.

* * * * *